UNITED STATES PATENT OFFICE.

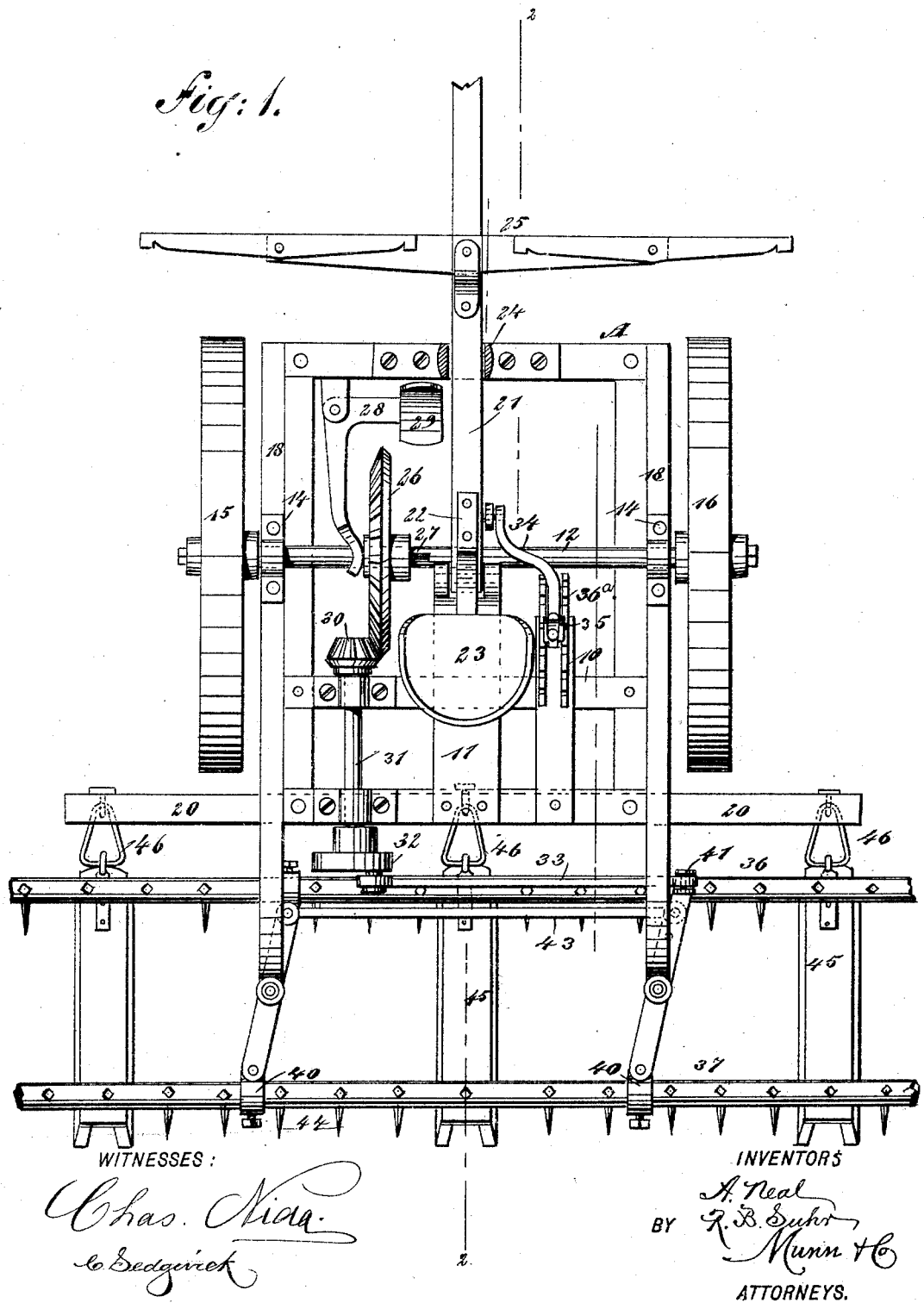

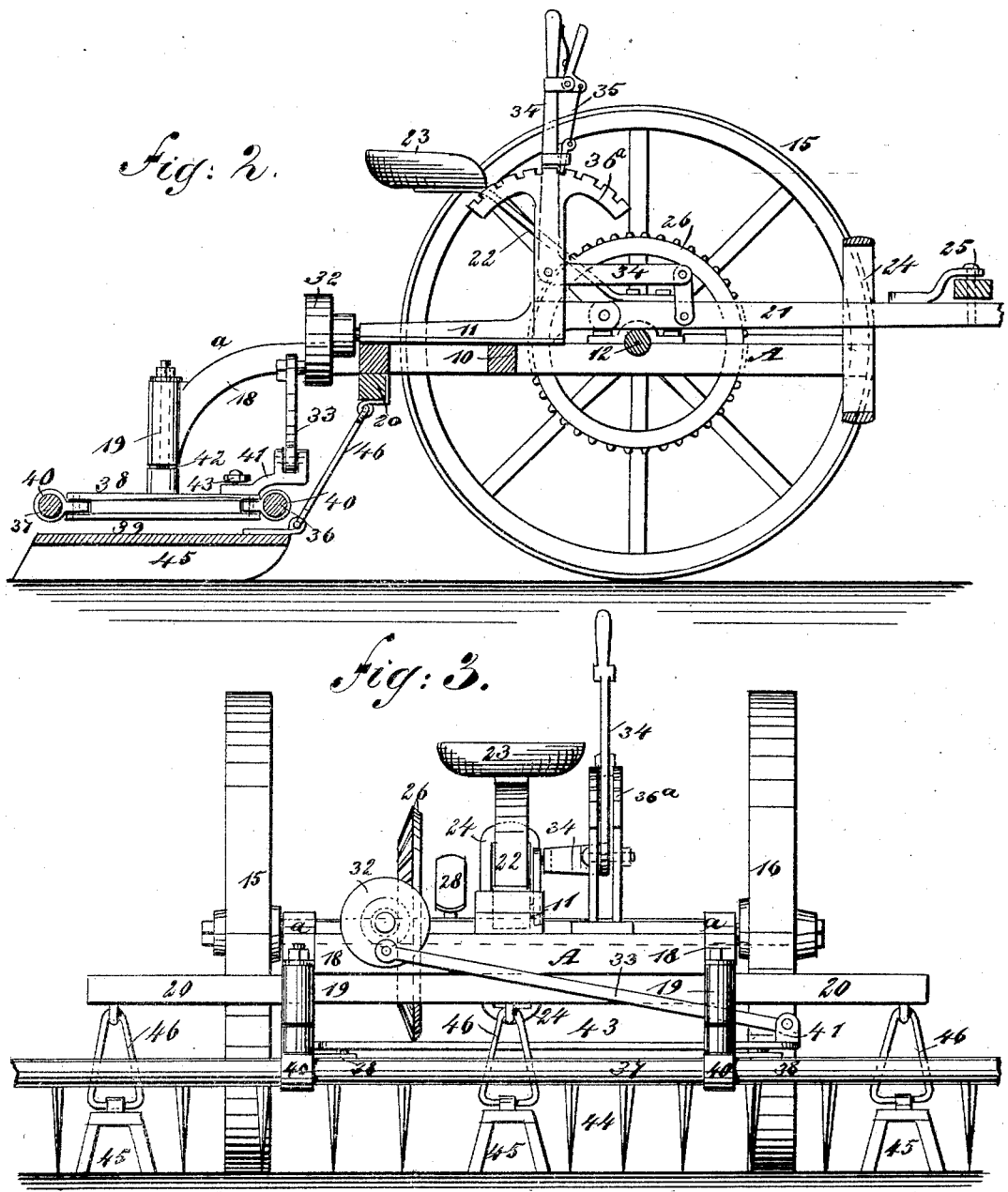

AUGUSTUS NEAL AND ROBERT B. SUHR, OF ASHLAND, NEBRASKA.

HARROW.

SPECIFICATION forming part of Letters Patent No. 503,434, dated August 15, 1893.

Application filed April 20, 1892. Serial No. 429,905. (No model.)

*To all whom it may concern:*

Be it known that we, AUGUSTUS NEAL and ROBERT B. SUHR, of Ashland, in the county of Saunders and State of Nebraska, have invented a new and useful Improvement in Sulky-Harrows, of which the following is a full, clear, and exact description.

Our invention relates to an improvement in sulky harrows, and has for its object to provide an implement of that character in which the harrow teeth will be given a laterally reciprocating movement as the implement advances; and a further object of the invention is to provide a means whereby two parallel rows of harrow teeth may be employed, the said rows of teeth being laterally reciprocated in opposite directions, and to provide a means whereby certain of the teeth may be removed and a shield attached to the beams carrying the teeth in such a manner as to cause the shield to cover and protect the young plants while the ground is being cultivated around them.

It is another object of the invention to provide a simple device capable of being expeditiously and conveniently manipulated whereby the harrow teeth may be made to enter the ground more or less deeply.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a plan view of the implement. Fig. 2 is a longitudinal vertical section taken practically on the line 2—2 of Fig. 1; and Fig. 3 is a rear elevation of the implement.

In carrying out the invention the frame A, is preferably made more or less rectangular and skeleton in general construction, the side beams being connected by a cross bar 10, located preferably near the rear end of the frame, and this cross bar and the rear beam of the frame proper support a longitudinal bracket beam 11, horizontally located at or near the center of the frame, which bracket beam terminates about mid-way between the front and the rear of the frame. The axle 12, which is journaled in suitable bearings 14, passes in front of the bracket beam, and is provided with two supporting wheels 15 and 16, which supporting wheels may be securely attached to the axle or loosely mounted thereon. In the latter event the usual pawl and ratchet connection is effected between the hubs of the wheels and the axle, so that the axle may be made to turn with the wheels, or remain stationary while the wheels revolve, as may be found desirable.

The wheels 15 and 16 are located outside of the frame, and the journal boxes 14, are secured preferably to arms 18, constructed of metal, which arms are attached to the outer faces of the side beams of the frame and extend some distance beyond the rear of the frame. The said arms at their rear extremities are curved downward, as shown at $a$ in Fig. 2, each arm terminating in a vertically disposed socket 19. The rear beam of the frame extends some distance beyond the sides thereof, as is shown in Figs. 1 and 3, the projecting portions of this beam being designated as 20. The forward end of the bracket beam 11, is recessed, and in the recess the pole 21, is pivotally secured, the pivotal end of the pole having connected therewith the standard 22 to which the seat 23, is secured. The pole passes through a yoke 24, attached to the central portion of the front cross bar of the frame, the yoke being essentially of link-like shape, whereby the pole may be raised and lowered to a considerable extent, as the yoke not only extends above the frame but projects downward below it, as illustrated in Fig. 2. The pole is provided with the usual whiffletree 25.

The axle 12, carries a bevel gear 26. This gear is splined upon the axle, and is therefore capable of turning with it or of having longitudinal movement upon it, and the gear is shifted against the tension of a spring 27, or the equivalent thereof, by a lever 28, the said lever being illustrated as a bell-crank lever, and as fulcrumed to the front of the frame. The lever 28, is also shown as provided with a foot rest 29, as it is adapted to be operated by the foot of the occupant of the seat, and one member of the lever 28, is forked so that it will engage with the hub of the gear 26. By pressing the transverse member of the lever outward, the longitudinal member thereof will force the gear 26, in direction of the center of the frame against the tension of the spring 27. The spring 27, acts to normally maintain the gear 26 in mesh with a beveled pinion 30, which pinion is secured to the forward end of a longitudinal shaft 31, journaled in the frame, as is best shown in Fig. 1. This shaft extends beyond the rear end of the frame, and at its rear extremity is provided with a crank disk 32, which crank disk carries a pitman 33.

The pole is raised and lowered through the medium of a lever 34, which is pivotally attached to the pole near its pivotal point; and the lever is provided with a thumb latch 35, the latter being adapted for engagement with a rack 36ª, projected vertically upward from the frame, as is best shown in Figs. 1 and 2.

The harrow section of the implement consists of two spaced and parallel head beams 36 and 37, and these beams are pivotally connected preferably by top and bottom transverse straps 38 and 39, the said straps being pivotally secured to flanged sleeves 40, secured upon the beams, as illustrated in Fig. 2. Two sets of these straps are ordinarily employed, one set between the center and each end, as shown in Fig. 1. One set of straps has secured at or near its forward end a bracket 41, and in this bracket the outer extremity of the pitman 33, connected with the crank disk 32, is pivotally secured. Each set of straps is further provided with an upwardly extending post 42, which posts are passed up through the sockets 19 of the metal arms a of the frame, and are secured in that position in any approved manner, the posts being free to turn in the sockets. The straps 38 and 39, pivotally connecting the head beams of the harrow are in their turn connected near their forward ends by a longitudinal bar 43, the bar having pivotal connection with the straps, as shown in Fig. 1. Thus through the medium of the crank disk 32 and the connection between that disk and the connecting mediums of the harrow head beams, the latter, as the crank disk is revolved, will be laterally reciprocated in opposite directions; and as each of the beams 36 and 37 is provided with series of downwardly-extending teeth 44, it will be observed that by reason of the reciprocating movements of the heads the teeth will stir and pulverize the ground into which they are entered as the implement is advanced. The teeth 44, are removably attached to the head beams 36 and 37, and such a connection is provided in order that shields 45, may be employed in connection with the harrow to protect young plants, as these shields are adapted to be drawn over the rows of plants, and the harrow teeth are adapted in this event to operate only upon the ground between the rows. These shields are essentially inverted V-shape in cross section, their tops being more or less flat; and in practice about three of these shields are used, one being connected with the frame at the central portion of its rear end, and the other two one near each extremity of the rear extension 20, the connections between the frame, its extensions and the shields being preferably effected through the medium of links 46. The shields are adapted to be dragged over the surface of the ground, and they extend beneath both of the harrow head beams. In order to enable them to be so located the teeth are removed from those portions of the head beams beneath which the shields pass, as shown in Fig. 1.

It will be observed that this implement is exceedingly simple, durable and economic, and that it will effectually pulverize and stir the ground over which it passes. If the implement is not to be employed in the culture of listed corn but is to be used upon an unplanted field, the shields 44, are not employed, and all of the harrow teeth are maintained in position in the head beams.

Having thus described our invention, we claim as new and desire to secure by Letters Patent—

1. A sulky harrow comprising a wheeled frame having downward curved extensions a at its rear end, links or straps pivoted between their ends to the said extensions, parallel toothed bars 36, 37 pivotally connected at the ends of said links or straps and gearing operated from the drive shaft for reciprocating the bars in opposite directions, substantially as set forth.

2. A sulky harrow comprising a wheeled frame having downward curved rear extensions a, provided with vertical sleeves 19, links or straps having central vertical pivots 42 mounted in said sleeves, transverse parallel toothed bars 36, 37 pivotally connected with the ends of said links or straps, a bar 43 connecting the links or straps, a crank shaft 31 geared to the drive shaft and a pitman 33, connecting the crank pin with the bracket 41 on one of the links or straps, substantially as set forth.

3. A harrow comprising the wheeled frame A, the downward curved extensions a a at the rear end thereof provided with vertical bearings 19, the links or straps having central vertical pivots mounted in said bearings, the parallel toothed bars 36, 37 carried by said links or straps, gearing for reciprocating said bars in opposite directions from the drive wheels, links 46, suspended from the rear cross bar 20 of the frame and the longitudinally extending guards pivotally secured at their forward ends to the lower ends of said links 46 and extending transversely beneath the toothed bars to protect the plants from injury by the teeth, substantially as set forth.

AUGUSTUS NEAL.
ROBERT B. SUHR.

Witnesses:
T. G. PALMER,
JOHN HOFFMAN.